United States Patent
Li (10) Patent No.: US 10,929,643 B2
(45) Date of Patent: Feb. 23, 2021

(54) 3D IMAGE DETECTION METHOD AND APPARATUS, ELECTRONIC DEVICE, AND COMPUTER READABLE MEDIUM

(71) Applicant: BOE TECHNOLOGY GROUP CO., LTD., Beijing (CN)

(72) Inventor: Zhenglong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 16/335,098

(22) PCT Filed: Aug. 16, 2018

(86) PCT No.: PCT/CN2018/100838
§ 371 (c)(1),
(2) Date: Mar. 20, 2019

(87) PCT Pub. No.: WO2019/037654
PCT Pub. Date: Feb. 28, 2019

(65) Prior Publication Data
US 2019/0347468 A1    Nov. 14, 2019

(30) Foreign Application Priority Data
Aug. 23, 2017 (CN) .......................... 201710731517.1

(51) Int. Cl.
*G06K 9/00* (2006.01)
*G06K 9/62* (2006.01)

(52) U.S. Cl.
CPC ......... *G06K 9/00201* (2013.01); *G06K 9/622* (2013.01); *G06K 9/6261* (2013.01); *G06K 9/6267* (2013.01); *G06K 2209/05* (2013.01)

(58) Field of Classification Search
None
See application file for complete search history.

(56) References Cited

U.S. PATENT DOCUMENTS 5,305,204 A * 4/1994 Ohhashi ................. G06T 5/009
382/131
2017/0356976 A1* 12/2017 Shapiro ................ A61B 5/7267
2019/0362522 A1* 11/2019 Han .................... G01R 33/5608

FOREIGN PATENT DOCUMENTS

CN     106408610 A    2/2017
CN     106780460 A    5/2017
(Continued)

OTHER PUBLICATIONS

International Search Report and Written Opinion dated Nov. 22, 2018, from application No. PCT/CN2018/100838.

*Primary Examiner* — Leon Viet Q Nguyen
(74) *Attorney, Agent, or Firm* — Thomas|Horstemeyer, LLP (57) ABSTRACT

The present disclosure provides a method and an apparatus for detecting a 3D image, an electronic device, and a computer-readable medium. The method for detecting a 3D image includes layering a 3D image to obtain at least one 3D subimage. The 3D subimage contains a plurality of 2D images. The method includes performing an intra-layer clustering on the 3D subimage to obtain a superpixel grid. The method includes inputting the superpixel grid into a neural network for detecting. The method includes detecting, in response to detecting an object in the superpixel grid, the 3D subimage forming the superpixel grid containing the object to obtain and output a detection result.

15 Claims, 3 Drawing Sheets

(56) References Cited

FOREIGN PATENT DOCUMENTS

| | | | |
|---|---|---|---|
| CN | 107067039 | A | 8/2017 |
| CN | 107688783 | A | 2/2018 |
| EP | 3 093 821 | A1 | 11/2016 |

* cited by examiner

3D IMAGE DETECTION METHOD AND APPARATUS, ELECTRONIC DEVICE, AND COMPUTER READABLE MEDIUM

CROSS-REFERENCE TO RELATED APPLICATIONS

The present disclosure is based upon International Application No. PCT/CN2018/100838, filed on Aug. 16, 2018, which claims priority to Chinese Patent Application No. 201710731517.1, filed on Aug. 23, 2017, titled "METHOD AND APPARATUS FOR DETECTING 3D IMAGE, ELECTRONIC DEVICE AND COMPUTER-READABLE MEDIUM", and the entire contents thereof are incorporated herein by reference.

TECHNICAL FIELD

The present disclosure relates to the field of image data processing technologies, and more particularly, to a method and an apparatus for detecting a 3D image, an electronic device, and a computer-readable medium.

BACKGROUND

Medical image data plays an extremely important role in the medical diagnosis process. At present, deep learning technologies are widely used in medical image processing.

The deep learning technologies can effectively use a lot of image data, learn to acquire knowledge, assist doctors to read and judge case images, such as X-ray images, DR, ultrasound and other two-dimensional images. The deep learning technologies have been practically use in hospitals.

It is to be noted that the above information disclosed in this Background section is only for enhancement of understanding of the background of the present disclosure and therefore it may contain information that does not form the prior art that is already known to a person of ordinary skill in the art.

SUMMARY

Arrangements of the present disclosure relate to a method and an apparatus for detecting a 3D image, an electronic device, and a computer-readable medium.

Other features and improvements of the present disclosure will become apparent from the following detailed description, or in part, be acquired by practice of the present disclosure.

According to an aspect of the present disclosure, there is provided a method for detecting a 3D image. The method includes layering the 3D image to obtain at least one 3D subimage. The 3D subimage includes a plurality of 2D images. The method includes performing an intra-layer clustering on the 3D subimage to obtain a superpixel grid. The method includes inputting the superpixel grid into a neural network for detecting. The method includes detecting the 3D subimage forming the superpixel grid containing the object to obtain and output a detection result based on a resolution of the 2D image in response to detecting an object in the superpixel grid by the neural network.

In some arrangements, a size of the 3D image is C×H×W. The C, the H, and the W respectively represent a number of the 2D images, a height and a width of the 2D image. The layering the 3D image includes splitting the 3D image into K 3D subimages, $C_i = C/K$. The K represents a natural number greater than 1, and the 3D subimage contains $C_i \times H \times W$ pixels.

In some arrangements, performing the intra-layer clustering on the 3D subimage further includes partitioning the 3D subimage into L×M grids in height and width directions. The L and the M represent natural numbers greater than 1. Such an operation further includes performing a clustering by taking the L×M grids as an initial value using a superpixel algorithm.

In some arrangements, the superpixel grid is inputted into a neural network for detecting using a first classifier.

In some arrangements, the 3D subimage forming the superpixel grid containing the object is detected using a second classifier. A precision of the second classifier is higher than that of the first classifier.

According to a second aspect of the present disclosure, there is also provided an apparatus for detecting a 3D image. The apparatus includes a layering component, configured to layer the 3D image to obtain at least one 3D subimage, wherein the 3D subimage includes a plurality of 2D images. The apparatus includes a clustering component, configured to perform an intra-layer clustering on the 3D subimage to obtain a superpixel grid. The apparatus includes a first detecting component, configured to input the superpixel grid into a neural network for detecting. The apparatus includes a second detecting component, configured to detect, in response to detecting an object in the superpixel grid, the 3D subimage forming the superpixel grid containing the object to obtain and output a detection result.

In some arrangements, a size of the 3D image is C×H×W. The C, the H, and the W respectively represent a number of the 2D images, a height and a width of the 2D image. The layering component is further configured to split the 3D image into K 3D subimages, $C_i = C/K$. The 3D subimage contains $C_i \times H \times W$ pixels, and wherein $C_i$ and K represent natural numbers greater than 1.

In some arrangements, the first detecting component detects the superpixel grid by using a first classifier. The second detecting component detects, using a second classifier, the 3D subimage forming the superpixel grid containing the object before the clustering. A precision of the second classifier is higher than that of the first classifier.

According to a third aspect of the present disclosure, there is also provided an electronic device. The electronic device includes a processor, a memory, and a computer-executable instruction stored in the memory. When the computer-executable instruction is executed by the processor, the processor is caused to perform one or more blocks of the method for detecting a 3D image according to at least one arrangement of the present disclosure.

According to a fourth aspect of the present disclosure, there is also provided a computer-readable medium storing a computer-executable instruction. When the computer-executable instruction is executed by a processor, one or more blocks of the method for detecting a 3D image according to at least one arrangement are implemented.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate arrangements conforming to the present disclosure and together with the description serve to explain the principles of the present disclosure. Apparently, the accompanying drawings in the following description show merely some arrangements of the present disclosure, and persons of ordinary skill in the art may still derive other drawings from these accompanying drawings without creative efforts.

DETAILED DESCRIPTION

Exemplary arrangements will be described more comprehensively by referring to accompanying drawings now. However, the exemplary arrangements can be embodied in many forms and should not be construed as limited to the arrangements set forth herein; rather, these arrangements are provided so that this disclosure will be made thorough and complete, and the concept of exemplary arrangements will be fully conveyed to those skilled in the art. The accompanying drawings are merely exemplary illustration of the present disclosure, and are not necessarily drawn to scale. The same reference numerals in the drawings denote the same or similar parts, and thus repeated description thereof will be omitted.

Furthermore, the described features, structures, or characteristics may be combined in any suitable manner in one or more arrangements. In the following description, numerous specific details are provided to provide a thorough understanding of the arrangements of the present disclosure. Those skilled in the art will recognize, however, that the technical solution of the present disclosure may be practiced without one or more of the specific details described, or that other methods, components, devices, steps, etc. may be employed. In other instances, well-known structures, methods, apparatuses, implementations, materials or operations are not shown or described in detail to avoid obscuring aspects of the present disclosure.

Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

As known by the inventor of the present disclosure, a neural network has been widely used in processing a 2D image, however, if the neural network is used in processing a 3D image, at least one of the following problems may exist.

Firstly, different from the 2D image, information of a plurality of adjacent images generally need to be considered to judge a lesion based on the 3D image. When the lesion is judged using the neural network, the 3D image is directly inputted into the neural network to implement an end-to-end training process. Taking a conventional CT image as an example, supposing the number of slices of CT data is 100, the number of pixels of the CT data is 100 times that of pixels of the 2D image in the case that the height and the width of the image remains unchanged. Even though an image processing procedure is completely executed by a graphics processing unit (GPU), the number of GPU graphic memories required for the CT image is much larger than that required for the 2D image of the same size. Therefore, for the 3D image, the memory usage is too large if the 3D image is trained using the neural network. The size of a training model is limited by the size of the GPU graphic memory, and thus it is difficult to use a neural network structure having a relatively high complexity.

Secondly, after the 3D image is inputted into the neural network, it is relatively difficult to train the 3D image. In the case of a large number of connections, the training procedure may increase time and increase the difficulty of converging to a local extremum.

In the present disclosure, the concept of the used neural network or the concept of deep learning (a multilayer neural network capable of feature learning, for example, a convolutional neural network) more widely used in the prior art exhibit good application performance in target recognition, target detection, target classification and the like of image processing, and thus are widely used in image processing. The convolutional neural network (CNN) may be, for example, a convolutional neural network including a plurality of convolutional layers. Features of different regions and dimensions in an image may be detected by different convolutional layers, such that the deep learning method developed based on the convolutional neural network may be used in classification and recognition of the image.

Convolutional neural networks of various structures have been developed. A traditional convolutional neural network typically is composed of an input layer, a convolutional layer, a pooling layer, a fully connected layer, and an output layer, that is, INPUT-CONV-POOL-FC-OUTPUT. The convolutional layer is configured to perform a feature extraction, the pooling layer is configured to perform dimensionality reduction on an inputted feature map, and the fully connected layer is configured to connect all the features and output the features.

As mentioned above, in the present disclosure, taking the convolutional neural network as an example, the basic concept of the neural network used in image processing is described, which is only exemplary. In the field of machine learning, there exist neural networks of various structures used in image processing, etc. In addition to the traditional convolutional neural network listed above, the convolutional neural network also may be a fully convolutional neural network (FCN), a segmentation network (SegNet), a dilated convolution network, a deep neural network DeepLab (V1&V2) based on atrous convolution, a deep neural network DeepLab (V3) based on multi-scale convolution, and a multi-channel segmentation neural network RefineNet, etc.

In the present disclosure, the images may be various types of images, for example, medical images. Based on classification of devices for acquiring medical images, the medical images may include ultrasound images, X-ray computed tomography (CT), magnetic resonance imaging (MRI) images, digital subtraction angiography (DSA), and positron emission computed tomography (PET), etc. Based on classification of contents of the medical images, the medical images may include brain tissue MRI images, spinal MRI images, fundus images, vascular images, pancreatic CT images, and lung CT images, etc.

For example, the images may be acquired by an image capturing apparatus. If the image is the medical image, the image capturing apparatus may include, for example, an ultrasound device, an X-ray device, an MRI device, a nuclear medicine device, a medical optical device, and a thermal imaging device, etc.

In the present disclosure, the 3D images such as 3D medical images include X-ray computed tomography (CT), magnetic resonance imaging (MM) images, digital subtraction angiography (3D DSA), and positron emission computed tomography (PET), etc.

It is to be noted that the images may also be character images, animal or plant images or landscape images, etc. Correspondingly, the 3D images may be formed by a 3D camera such as a 3D light field camera, a ToF camera, a multi-lens camera, an RGB-D camera, etc.

In the present disclosure, the images may be grayscale images or color images. The color images may be decomposed into R, G and B single-color channel images.

Figure 1:
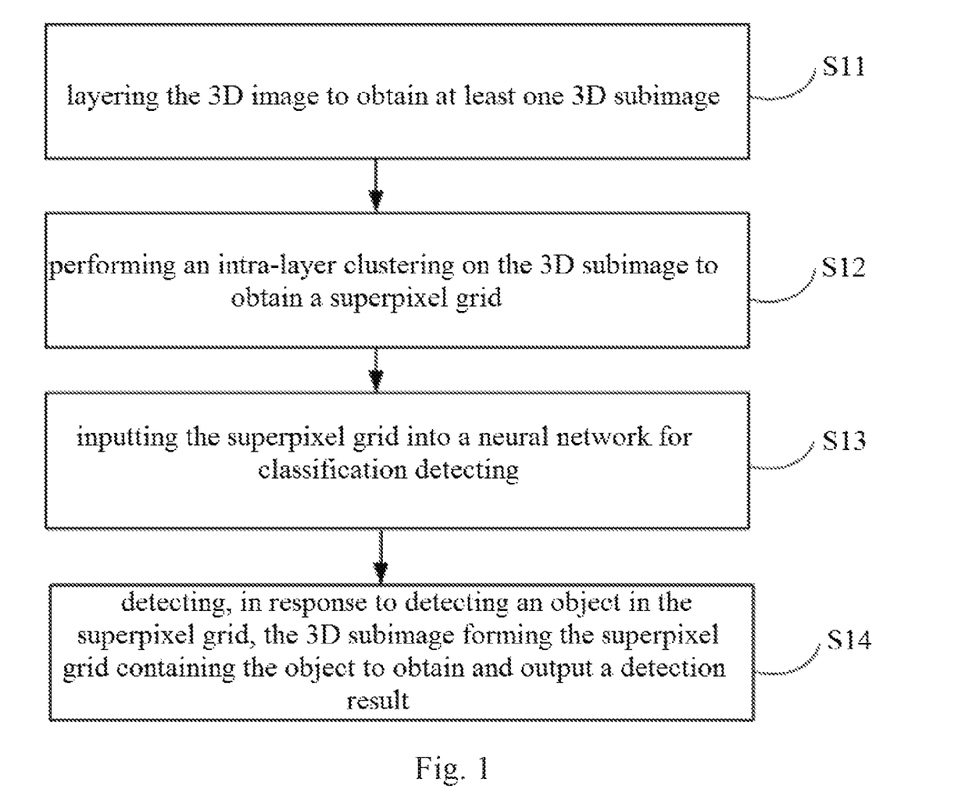
FIG. 1 illustrates a schematic diagram of a method for detecting a 3D image according to an arrangement of the present disclosure.

FIG. 1 illustrates a schematic diagram of a method for detecting a 3D image according to some arrangements of the present disclosure. The method for detecting the 3D image includes the following blocks.

As shown in FIG. 1, in block S11, the 3D image is layered to obtain at least one 3D subimage. Each 3D subimage includes a plurality of 2D images.

As shown in FIG. 1, in block S12, an intra-layer clustering is performed on the 3D subimage to obtain a superpixel grid.

As shown in FIG. 1, in block S13, the superpixel grid is inputted into a deep neural network for detecting.

As shown in FIG. 1, in block S14, if an object is detected in the superpixel grid, the 3D subimage forming the superpixel grid containing the object before the clustering is detected to obtain and output a detection result.

According to the method for detecting a 3D image provided by the arrangements of the present disclosure, a superpixel grid is obtained by performing layering and clustering, a low-precision detection is performed on the superpixel grid, and a high-precision detection is performed on the superpixel grid with an object detected. In this way, the objective of reducing memory used is achieved.

In some arrangements, layering the 3D image includes: marking the size of the 3D image $I_{C \times H \times W}$ as C×H×W. The C, H, W respectively represent the number of channels of the image (i.e., the number of the 2D images forming the 3D image), a height and a width of the 2D image. The 3D image $I_{C \times H \times W}$ is sequentially split (e.g., from top to bottom) into K 3D subimages $I_{C_i \times H \times W}$. $C_i$=C/K, the K is a natural number greater than 1, such that each 3D sub-image $I_{C_i \times H \times W}$ has $C_i$×H×W pixels. That is, the 3D image is split on a channel on a basis of each $C_i$ pictures. For example, a 100×320×420 3D image is 100 images having a size of 320×420. 100 represents the number of channels, 320 represents the height of the image, and 420 represents the width of the image. Supposing the K is 4, the 3D image is split into four 3D subimages. Each of the 3D subimages has a size of 25×320× 420, i.e., $C_i$=C/K=100/4=25. That is, each of the 3D sub-images includes 25 images having a size of 320×420, which is a 25-dimensional vector.

Figure 2:
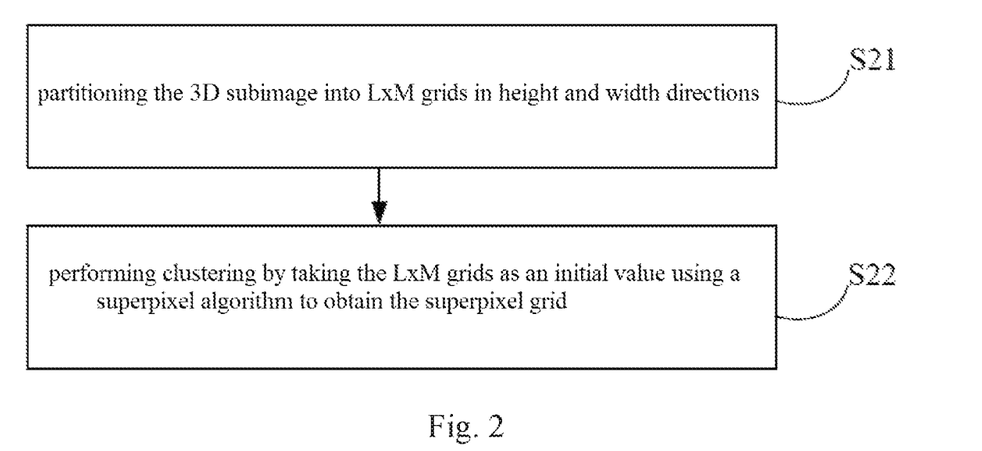
FIG. 2 illustrates a schematic diagram of block S12 in an arrangement of the present disclosure.

Referring to FIG. 2, FIG. 2 shows an operation of performing an intra-layer clustering on the 3D subimage to obtain a superpixel grid according to some arrangements of the present disclosure. The operation specifically includes the following blocks.

As shown in FIG. 2, in block S21, the 3D subimage is partitioned into L×M grids in height and width directions. The L and the M represent natural numbers greater than 1.

It is to be noted that the L and the M may be either unequal or equal (i.e., L×L or M×M). It is merely intended to split the 3D subimage having a height of H and a width of W into a plurality of grids. The size (i.e., the value of the L and/or the value of the M) and the shape (i.e., whether the L and the M are equal) of each grid may be selected as required.

As shown in FIG. 2, in block S22, the superpixel grid is obtained by performing clustering by taking the L×M grids as an initial value using a superpixel algorithm.

For example, the 3D subimage is split into L×L grids in the height and width directions, i.e., the grid may be a square grid (or may be a rectangular grid). After the clustering is completed, each grid is characterized by a single vector. By clustering, the $I_{C_i \times H \times W}$ be expressed as $I_{C_i \times L \times L}$. The $I_{C_i \times L \times L}$ may be regarded as an image having a size of L×L, and each pixel is a $C_i$-dimensional vector.

Thus, according to the arrangements of the present disclosure, a corresponding superpixel grid is obtained by clustering the 3D subimage. Each superpixel grid includes a plurality of grids formed by splitting in the height and width directions. Taking an example where the 3D subimage is split into L×L grids in the height and width directions, after the intra-layer clustering is completed, the number of pixels of the 3D subimage is reduced from $C_i$×H×W to L×L. That is, the intra-layer clustering is performed on the subimage in blocks S11 and S12 to reduce information redundancy of the 3D subimage $I_{C_i \times H \times W}$, and in the meanwhile, related pixels are fused. In this way, the objective of dimensionality reduction may be achieved, the number of pixels may be decreased, and the resolution may be reduced.

The superpixel may be generated by over-segmentation among various image segmentation methods. These image segmentation methods include, for example, SLIC (Simple Linear Iterative Cluster), SEEDS (Superpixels Extracted via Energy-Driven Sampling), LSC (Linear Spectral Clustering) and the like. Generating the superpixel by using the SLIC is taken as an example to make an exemplary description. The general idea of the SLIC algorithm is as below: an image is converted from color space RGB to color space CIE-Lab, a color value (L, a, b) and a coordinate (x, y) corresponding to each pixel form a 5-dimensional vector V[L, a, b, x, y], and the similarity between two pixels may be measured by a distance between their vectors. The larger the distance is, the smaller the similarity is.

According to the SLIC algorithm, K seed points are generated first, then in surrounding space of each seed point, a plurality of pixels the closest to this seed point are searched for, and these pixels and this seed point are classified as the same category until all the pixels are classified. Next, the average vector value of all the pixels in the K superpixels is calculated to regain K clustering centers, then around the K centers, a plurality of pixels the most similar to the K centers are searched for, K superpixels are regained after all the pixels are classified, the clustering centers are updated and are iterated again until convergence.

The SLIC algorithm accepts a parameter K, which is used for specifying the number of superpixels generated. Supposing the original image have N pixels, each segmented superpixel approximately has N/K pixels, and a side length of each superpixel is approximately S=[N/K]^0.5. One clustering center is selected every S pixels, next a plurality of pixels the most similar to the center are searched for within search space having a range of 2S*2S around the clustering centers.

Alternatively, to prevent the selected clustering center from being an unreasonable point such as edge or noise, the clustering center is moved, within a 3*3 window, to a region with the smallest gradient. The gradient is defined as:

$$G(x,y)=[V(x+1,y)-V(x-1,y)]^2 \pm [V(x,y+1)-V(x,y-1)]^2.$$

In this way, the situation mentioned above may be avoided. The L, the a and the b are in the color space CIE-Lab, and the L, the a and the b are limited in size, whereas the image size is not limited. Therefore, if an image is larger in size, the effect of a space distance (x, y) is huge when measuring the vector distance.

Alternatively, to modulate the effect of the space distance (x, y), the x and the y are normalized. Improved measurement of the vector distance is as follows:

$$d\_lab = [(Lk-Li)^2 + (ak-ai)^2 + (bk-bi)^2]^{0.5}$$

$$d\_xy = [(Xi-Xk)^2 \pm (Yk-Yi)^2]^{0.5}$$

$$Ds = d\_lab + (m/S)*d\_xy.$$

The m represents a weight used for adjusting d_xy, which may be selected as 1-20. For example, the m is set to 10.

To avoid the possibility that a small region d is marked as belonging to a certain superpixel but not connected to this superpixel, this small region d is reclassified as the largest superpixel connected to this small region d to ensure the integrity of each superpixel.

In this arrangement, the "detection/detecting/detected" in block S13 and block S14 refers to making a classification using a neural network, the difference lies in that: in Step S13, the superpixel grid is inputted into the deep neural network and is detected using the first classifier, whereas in block S14, the 3D subimage forming the superpixel grid containing the object is detected, one by one, using the second classifier, and the precision of the second classifier is higher than that of the first classifier.

For example, in the detection result of block S13, it is determined whether an object to be detected exists in the superpixel grid, for example, whether a lesion exists. If the object is detected in the superpixel grid, this indicates that the lesion exists in the 3D subimage before clustering, which forms this superpixel grid by clustering, and thus it is required to make a further fine detection, i.e., block S14. If no object is detected in the superpixel grid, this indicates that no lesion exists in the 3D subimage before clustering, which forms this superpixel grid by clustering, and thus it is not required to make a finer detection, so the detection is over. That is, it is only required to make a fine detection on a 3D subimage before clustering, which forms a superpixel grid containing an object, whereas it is not required to make a fine detection on a 3D subimage before clustering, which forms a superpixel grid not containing an object. Therefore, the training is simpler, and training time is greatly shortened.

Taking a pulmonary nodule as an example, if the object detected in block S13 is a pulmonary nodule on the 3D image, the 3D subimage after dimensional reduction may be first detected to determine whether the pulmonary nodule may exist. The first classifier used in this process has a low missed alarm rate, although a higher false alarm rate is allowed.

The lower the missed alarm rate and the false alarm rate are, the better it is. However, generally, it is impossible to reach the optimum missed alarm rate and false alarm rate at the same time. When other conditions are given, the lower the false alarm rate is, the higher the missed alarm rate is, and vice versa. Generally, when one error probability does not exceed a certain value (for example, not more than 1%), the other error probability is controlled as low as possible. That is, in this arrangement, the missed alarm rate is ensured to be as low as possible in a coarse detection, i.e., not object is missed, but the false alarm rate may be higher at this moment. However, the objective of a primary detection (also referred to as the coarse detection) is to select the superpixel grid containing the object.

In block S14, after the object is detected, a secondary detection (also referred to as a fine detection) is performed on the 3D subimage before clustering, which forms the superpixel grid containing the object. The detection performed on the superpixel after clustering in block S13 directs at an image with lower resolution. In contrast, the fine detection in block S14 is a detection made according to the resolution of the 2D image forming the 3D subimage. Therefore, the precision of the second classifier is higher than that of the first classifier.

It is to be noted that the detection result obtained by performing the fine detection in block S14 in this arrangement may be the position or shape of the lesion on the 2D image, or the detection result may be directly outputted to indicate whether the lesion exists. The specific type of the detection result may be adjusted by selecting the corresponding neural network structure. For example, the neural network may output, via the SoftMax classifier, the LR classifier or the like, the detection result indicating whether the lesion exists or what type of lesion exists. A neural network for image segmentation such as R-CNN and SegNet may be selected to output the position or shape of the lesion on the 2D image.

According to the method for detecting a 3D image provided by the arrangement of the present disclosure, a 3D image is layered and clustered, and a layering detection is performed on the superpixel grid obtained by clustering, and a fine detection is further made if an object exists. In this way, demand for the system operation capability may be reduced, making memory usage smaller, training simpler, and running time shorter, thus enhancing the detection efficiency.

Figure 3:
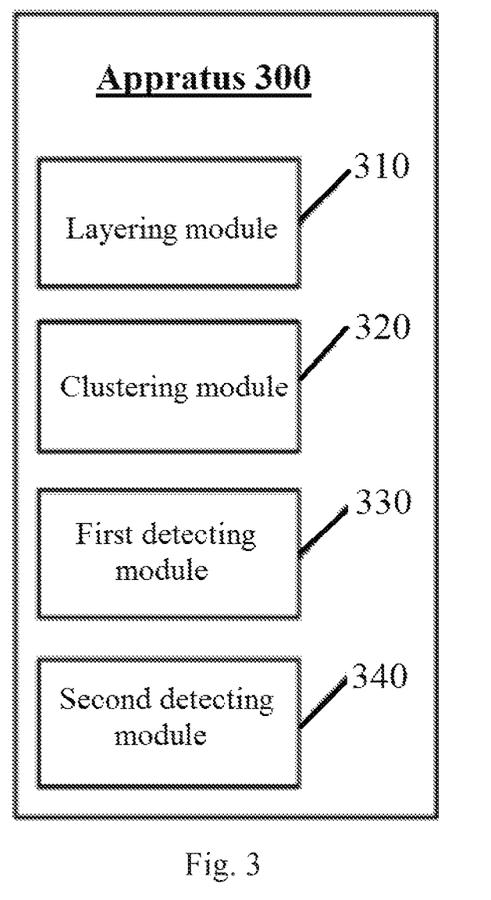
FIG. 3 illustrates a schematic diagram of an apparatus for detecting a 3D image according to another arrangement of the present disclosure.

FIG. 3 also illustrates a schematic diagram of an apparatus for detecting a 3D image according to another arrangement of the present disclosure. The apparatus 300 includes: a layering component 310, a clustering component 320, a first detecting component 330, and a second detecting component 340.

The layering component 310 is configured to layer a 3D image to obtain at least one 3D subimage. The 3D subimage includes a plurality of 2D images.

The clustering component 320 is configured to perform an intra-layer clustering on the 3D subimage to obtain a superpixel grid.

The first detecting component 330 is configured to input the superpixel grid into a deep neural network for detecting.

The second detecting component 340 is configured to detect, when an object is detected in the superpixel grid, the 3D subimage forming the superpixel grid containing the object before clustering to obtain and output a detection result.

For a detailed working process of the layering component 310 and the clustering component 320, reference may be made to a corresponding description of the foregoing method, and details are not described herein again.

In the arrangements of the present disclosure, the first detecting component 330 detects the superpixel grid by using a first classifier, and the second detecting component 340 detects, using a second classifier, the 3D subimage forming the superpixel grid containing the object before the clustering. A precision of the second classifier is higher than that of the first classifier.

It is to be noted that for the functions of each component in the apparatus for detecting a 3D image, reference may be made to the above method arrangements, and details are not repeatedly described herein.

The apparatus for detecting a 3D image in this arrangement may implement the same technical effects as the method for detecting a 3D image, and details are not repeatedly described herein.

In another aspect, an arrangement of the present disclosure also provides an electronic device, which includes: a processor; a memory; and a computer-executable instruction stored in the memory. When the computer-executable instruction is executed by the processor, the processor is caused to perform one or more blocks of the following method for detecting a 3D image: layering a 3D image to obtain at least one 3D subimage. The 3D subimage includes a plurality of 2D images; performing an intra-layer clustering on the 3D subimage to obtain a superpixel grid; inputting the superpixel grid into a neural network for detecting; and detecting, in response to detecting an object in the superpixel grid, the 3D subimage forming the superpixel grid containing the object to obtain and output a detection result.

For further description of one or more blocks of the method for detecting a 3D image, reference may be made to the description of the above method for detecting a 3D image.

Figure 4:
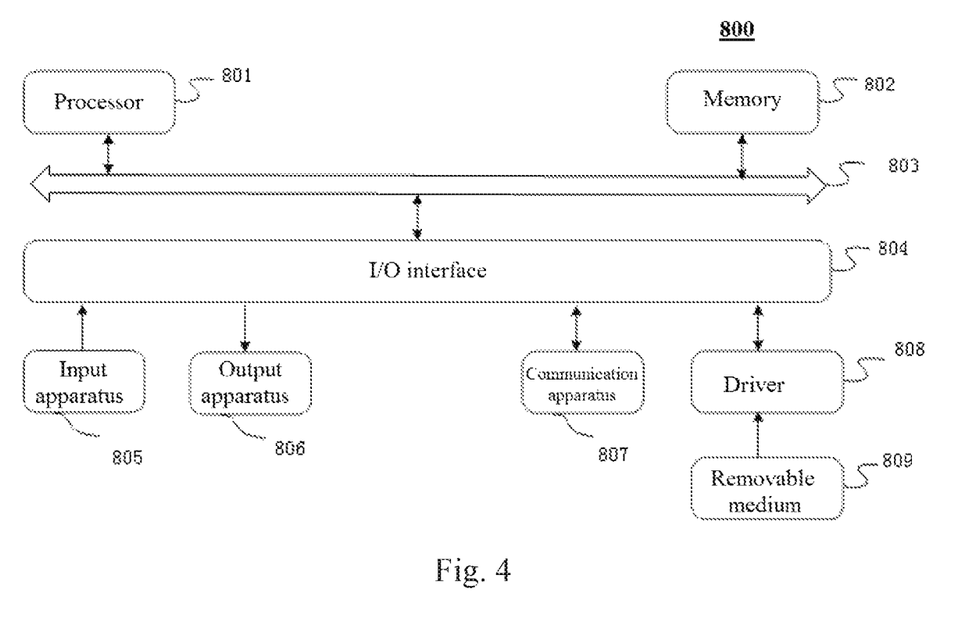
FIG. 4 illustrates a schematic structural diagram of a computer system of an electronic device according to still another arrangement of the present disclosure.

Referring to FIG. 4 below, a schematic structural diagram of a computer system 400 adapted to implement an electronic device of the arrangements of the present disclosure is shown. The electronic device as shown in FIG. 4 is merely an example, and no limitation should be imposed on functions or scope of use of the arrangements of the present disclosure.

As shown in FIG. 4, the computer system 800 includes one or more processors 801, which may execute various operations according to program instructions stored in a memory 802 (for example, the program instructions are stored in the memory 802 such as a read-only memory (ROM) or a conventional magnetic disk memory or the like and are loaded into a random access memory (RAM)). The memory 802 also stores various programs and data required by operations of the computer system 800. The processor 801 and the memory 802 are connected to one another through a bus 803. An input/output (I/O) interface 804 is also connected to the bus 803.

Various components may be connected to the I/O interface 804 to implement input and output of information. For example, these components include an input apparatus 805 such as a keyboard and a mouse etc.; an output apparatus 806 such as a cathode ray tube (CRT), a liquid crystal display device (LCD), and a speaker etc.; and a communication apparatus 807 comprising a network interface card, such as a LAN card and a modem. The communication apparatus 807 performs communication processes via a network, such as the Internet. A driver 808 is also connected to the I/O interface 803 as required. A removable medium 809 such as a magnetic disk, an optical disk, a flash memory and so on are connected to or installed in the driver 808 as required.

The processor 801 may be a logic operation device having a data processing capability and/or program execution capability, for example, a central processing unit (CPU), or a field programmable gate array (FPGA), or a microprogrammed control unit (MCU), or a digital signal processor (DSP), or an application specific integrated circuit (ASIC), etc.

The bus 803 may be a front side bus (FSB), QuickPath Interconnect (QPI), a direct media interface (DMI), Peripheral Component Interconnect (PCI), Peripheral Component Interconnect Express (PCI-E), HyperTransport (HT), etc.

According to an arrangement of the present disclosure, the process described above with reference to the flow chart may be implemented in a computer software program. For example, an arrangement of the present disclosure includes a computer program product, which comprises a computer program that is tangibly embedded in a computer-readable medium. The computer program comprises program codes for executing the image processing method as recited in at least one arrangement of the present disclosure. In such an arrangement, the computer program may be downloaded and installed from a network via the communication apparatus 807, and/or may be installed from the removable media 809. The computer program, when executed by the processor 801, implements the functions as defined by the system of the present disclosure. It is to be noted that the computer-readable medium shown in the present disclosure may be a computer-readable signal medium or a computer-readable medium, or any combination thereof. The computer-readable medium may be, for example, but not limited to, an electronic, magnetic, optical, electromagnetic, infrared, or semiconductor system, apparatus, or device, or any combination of the foregoing. More specific examples of the computer-readable medium may include, but not limited to: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer-readable medium may be any tangible medium that can contain or store a program for use by or in connection with an instruction execution system, apparatus, or device. However, in the present disclosure, the computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any suitable combination thereof The computer-readable signal medium also may be any computer-readable medium that is not a computer-readable medium and that can communicate, propagate, or transport a program for use by or in connection with an instruction execution system, apparatus, or device. Program code embodied on the computer-readable medium may be transmitted using any appropriate medium, including but not limited to wireless, wireline, optical fiber cable, RF, etc., or any suitable combination of the foregoing.

The flowcharts and block diagrams in the figures illustrate architectures, functions and operations that may be implemented according to the system, the method and the computer program product of the various arrangements of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams or the flowcharts and/or a combination of the blocks in the block diagrams or the flowcharts may be implemented by a dedicated hardware-based system executing specified functions or operations, or by a combination of a dedicated hardware and computer instructions.

The units involved in the arrangements of the present disclosure may be implemented by way of software or hardware. The described units also may be provided in a processor, for example, described as: a processor, including a sending unit, an acquiring unit, a determining unit, and a first processing unit. Names of these units are not considered as a limitation to the units in some cases. For example, the sending unit also may be described as "a unit for sending a picture acquiring request to a connected server".

In another aspect, the present disclosure further provides a computer-readable medium. The computer-readable medium may be the medium included in the device described in the above arrangements, or a stand-alone medium which has not been assembled into the device. The above computer-readable medium carries one or more programs. When the one or more programs are executed by the processor of the device, the processor is caused to perform one or more blocks of the following method for detecting a 3D image: layering a 3D image to obtain at least one 3D subimage. The 3D subimage includes a plurality of 2D images; performing an intra-layer clustering on the 3D subimage to obtain a superpixel grid; inputting the superpixel grid into a neural network for detecting; and detecting, in response to detecting an object in the superpixel grid, the 3D subimage forming the superpixel grid containing the object to obtain and output a detection result.

For further description of one or more blocks of the method for detecting a 3D image, reference may be made to the description of the above method for detecting a 3D image.

It is to be clearly understood that the present disclosure describes how to form and use particular examples, but principles of the present disclosure are not limited to any detail of these examples. Rather, based on the teaching of the contents disclosed by the present disclosure, these principles can be used in many other arrangements.

The exemplary arrangements of the present disclosure are shown and described above in detail. It is to be understood that the present disclosure is not limited to the detailed structures, arrangement modes or implementation methods set forth herein, but rather that the present disclosure is intended to cover various modifications and equivalent arrangements included within the spirit and scope of the appended claims.

What is claimed is:

1. A method for detecting 3D images, comprising:
    layering a 3D image to obtain at least one 3D subimage, wherein the 3D subimage comprises a plurality of 2D images;
    performing an intra-layer clustering on the 3D subimage to obtain a superpixel grid;
    inputting the superpixel grid into a neural network for detecting; and
    detecting, in response to detecting an object in the superpixel grid, the 3D subimage forming the superpixel grid containing the object to obtain and output a detection result
    wherein performing an intra-layer clustering on the 3D subimage further comprises:
        partitioning the 3D subimage into L×M grids in height and width directions, wherein the L and the M represent natural numbers greater than 1; and
        performing a clustering by taking the L×M grids as an initial value using a superpixel algorithm.

2. The method for detecting a 3D image according to claim 1, wherein a size of the 3D image is C×H×W, wherein the C, the H, and the W respectively represent a number of the 2D images, a height and a width of the 2D image, and layering a 3D image further comprises:
    splitting the 3D image into K 3D subimages, Ci=C/K, wherein the 3D subimage contains Ci×H×W pixels, and wherein Ci and K represent natural numbers greater than 1.

3. The method for detecting a 3D image according to claim 1, wherein inputting the superpixel grid into a neural network for detecting further comprises: performing a detecting using a first classifier.

4. The method for detecting a 3D image according to claim 3, wherein detecting the 3D subimage forming the superpixel grid containing the object further comprises: performing a detecting using a second classifier, wherein a precision of the second classifier is higher than that of the first classifier.

5. An apparatus for detecting 3D images, comprising:
    a layering component configured to layer a 3D image to obtain a plurality of 3D subimages, wherein the 3D subimage comprises a plurality of 2D images;
    a clustering component configured to perform an intra-layer clustering on the 3D subimage to obtain at least one superpixel grid;
    a first detecting component configured to input the at least one superpixel grid into a neural network for detecting; and
    a second detecting component configured to detect, in response to detecting an object in the superpixel grid, the 3D subimage forming the superpixel grid containing the object to obtain and output a detection result,
    wherein the clustering component is further configured to:
        partition the 3D subimage into L×M grids in height and width directions, wherein the L and the M represent natural numbers greater than 1; and
        perform a clustering by taking the L×M grids as an initial value using a superpixel algorithm.

6. The apparatus for detecting a 3D image according to claim 5, wherein a size of the 3D image is C×H×W, wherein the C, the H, and the W respectively represent a number of the 2D images, a height and a width of the 2D image, and the layering the 3D image comprises: splitting the 3D image into K 3D subimages, Ci=C/K, wherein the 3D subimage contains Ci×H×W pixels, and wherein Ci and K represent natural numbers greater than 1.

7. The apparatus for detecting a 3D image according to claim 5, wherein the first detecting component detects the superpixel grid by using a first classifier, and the second detecting component detects, by using a second classifier, the 3D subimage forming the superpixel grid containing the object before the clustering, wherein a precision of the second classifier is higher than that of the first classifier.

8. An electronic device, comprising:
    at least one hardware processor; and
    a memory having computer-executable instructions stored thereon that, when executed by the at least one hardware processor, direct the at least one hardware processor to perform one or more blocks of the method according to claim 1.

9. The electronic device according to claim 8, wherein a size of the 3D image is C×H×W, wherein the C, the H, and the W respectively represent a number of the 2D images, a height and a width of the 2D image, and the layering the 3D image comprises:

splitting the 3D image into K 3D subimages, Ci=C/K, wherein the 3D subimage contains Ci×H×W pixels, and wherein Ci and K represent natural numbers greater than 1.

10. The electronic device according to claim 8, wherein inputting the superpixel grid into a neural network for detecting further comprises: performing a detecting using a first classifier.

11. The electronic device according to claim 10, wherein detecting the 3D subimage forming the superpixel grid containing the object further comprises: performing a detecting using a second classifier, wherein a precision of the second classifier is higher than that of the first classifier.

12. A non-transitory computer-readable medium storing computer-executable instructions that, when executed by at least one hardware processor, one or more blocks of a method for detecting a 3D image are implemented, wherein the method for detecting a 3D image comprises:

layering the 3D image to obtain at least one 3D subimage, wherein the 3D subimage comprises a plurality of 2D images;

performing an intra-layer clustering on the 3D subimage to obtain a superpixel grid;

inputting the superpixel grid into a neural network for detecting; and detecting, in response to detecting an object in the superpixel grid, the 3D subimage forming the superpixel grid containing the object to obtain and output a detection result, wherein performing an intra-layer clustering on the 3D subimage further comprises:

partitioning the 3D subimage into L×M grids in height and width directions, wherein the L and the M represent natural numbers greater than 1; and performing a clustering by taking the L×M grids as an initial value using a superpixel algorithm.

13. The non-transitory computer-readable medium according to claim 12, wherein a size of the 3D image is C×H×W, wherein the C, the H, and the W respectively represent a number of the 2D images, a height and a width of the 2D image, and layering the 3D image further comprises:

splitting the 3D image into K 3D subimages, Ci=C/K, wherein the 3D subimage contains Ci×H×W pixels, and wherein Ci and K represent natural numbers greater than 1.

14. The non-transitory computer-readable medium according to claim 12, wherein inputting the superpixel grid into a neural network for detecting further comprises: performing a detecting using a first classifier.

15. The non-transitory computer-readable medium according to claim 14, wherein detecting the 3D subimage forming the superpixel grid containing the object further comprises: performing a detecting using a second classifier, wherein a precision of the second classifier is higher than that of the first classifier.

* * * * *